United States Patent
Jacob et al.

(10) Patent No.: US 6,567,186 B1
(45) Date of Patent: May 20, 2003

(54) METHOD FOR DETERMINING GRAY VALUES IN A PRINTER

(75) Inventors: Steve A. Jacob, Boise, ID (US); Terry A. Smith, Boise, ID (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/181,063

(22) Filed: Oct. 27, 1998

(51) Int. Cl.[7] ............................. G06F 3/12; G06K 15/02
(52) U.S. Cl. ................... 358/1.9; 358/500; 358/518; 358/455; 382/167
(58) Field of Search ................... 358/1.9, 500, 518, 358/501, 502, 504, 525, 455, 456, 3.01, 3.02, 3.03, 3.06; 347/24, 3; 382/166–168

(56) References Cited

U.S. PATENT DOCUMENTS

| | | | |
|---|---|---|---|
| 4,897,799 A | * 1/1990 | Le Gall et al. | 345/428 |
| 4,967,379 A | * 10/1990 | Ott | 364/526 |
| 5,081,529 A | * 1/1992 | Collette | 358/80 |
| 5,111,302 A | * 5/1992 | Chan et al. | 347/15 |
| 5,367,387 A | * 11/1994 | Yamaguchi | |
| 5,481,655 A | * 1/1996 | Jacobs | 395/109 |
| 5,539,540 A | * 7/1996 | Spaulding et al. | 358/518 |
| 5,557,430 A | * 9/1996 | Isemura et al. | 358/501 |
| 5,689,349 A | * 11/1997 | Plettinck et al. | 358/500 |
| 5,914,723 A | * 6/1999 | Gajewska | |
| 5,930,396 A | * 7/1999 | Fiala et al. | 358/3.23 |
| 5,937,089 A | * 8/1999 | Kobayashi | 358/518 |
| 5,978,011 A | * 11/1999 | Jacob et al. | 347/251 |
| 6,008,907 A | * 12/1999 | Vigneau | |
| 6,031,628 A | * 2/2000 | Jacob et al. | 345/591 |
| 6,081,653 A | * 6/2000 | Zandian | 395/109 |
| 6,118,455 A | * 9/2000 | Hidaka et al. | 345/431 |
| 6,151,135 A | * 11/2000 | Tanake et al. | 358/1.9 |

FOREIGN PATENT DOCUMENTS

| | | | |
|---|---|---|---|
| EP | 0892549 | * 1/1999 | ......... H04N/1/405 |
| JP | 405216989 | * 8/1993 | |
| JP | 408016778 | * 1/1996 | |

OTHER PUBLICATIONS http://www.w3.org/Graphics/Color/sRGB.html, Version 1.10, Nov. 5, 1996, pp 1–16, Micheal Stokes et al., "A Standard Default Color Space for the Internet–sRGB".*

The Fifth Color Imaging Conference: Color Science, System, and Application, Nov. 17–20, 1977 pp. 44–49, Jan Movoric et al., "Gamut Mapping Alogrithms Based on Psychological Experiment".*

SMPTE Recommended Practice, Nov. 1, 1993, pp 1–5, "Derivation of Basic Television Color Equations".*

* cited by examiner

*Primary Examiner*—Edward Coles
*Assistant Examiner*—Tia A Carter

(57) ABSTRACT

The method of the invention converts colors resident in a first device color space to gray levels for reproduction in a color or monochrome rendering device. The method initially converts the color values resident in the first device color space to corresponding color values in a device independent color space. Next, the resulting color values in the device independent color space are converted to further color values in the same color space that correspond to color values resident in the color space of a target color rendering device. The further color values from the device independent color space are then converted to corresponding gray levels so that they may be rendered by either the target color rendering device or a different color or monochrome rendering device. The use of an intermediate gamut conversion within the device independent color space enables more precise gray representations to be achieved for certain color representations.

20 Claims, 2 Drawing Sheets

US 6,567,186 B1

METHOD FOR DETERMINING GRAY VALUES IN A PRINTER

FIELD OF THE INVENTION

This invention relates to a method for converting colors from a first device color space to gray levels for reproduction by a color or monochrome rendering device. More particularly, the invention relates to a method for attaining improved gray representations from a color or monochrome printer in response to an input color image.

BACKGROUND OF THE INVENTION

It is well known that color monitors exhibit a larger color gamut than currently available laser and inkjet color printers. The prior art has suggested a number of methods for achieving more faithful reproduction of monitor colors from such printers. For instance, U.S. Pat. No. 5,081,529 to Collette describes a color calibration system that enables a user to achieve such more faithful color reproductions. Essentially, a hard copy print is made from a processed image and if it does not match the monitor image colors, a color correction algorithm is invoked which is responsive to operator adjustments to revise the color controls within the printer. Accordingly, after several iterations, a more faithful color reproduction from the printer is achieved.

The procedure described in the Collette patent can be termed a "gamut" mapping action wherein the colors that can be produced by one device are mapped into a color space that can be reproduced by another device. Morovic et al. in "Gamut Mapping Algorithms Based on Psychophysical Experiment", The Fifth Color Imaging Conference: Color Science, Systems and Applications, Nov. 17–20, 1997, pp 44–49, describe five gamut mapping algorithms. Morovic et al., in one example, derive an image's red, green and blue (RGB) values that are utilized to present the image on a monitor. Those values are first transformed into XYZ tristimulus values, a transformation specified by a 1931 standard published by the CIE (Commission Internationale de L'Eclairage). The XYZ tristimulus values are then utilized to enable CIE L*a*b* coordinates to be calculated.

The CIE L*a*b* color space is a device independent color space that is produced by plotting, in rectangular coordinates, the L*a*b* quantities defined by the following equations:

$$L^* = 116(Y/Y_n)^{1/3} - 16$$

where:
$Y/Y_n > 0.008856$ $$a^* = 500\{(X/X_n)^{1/3} - (Y/Y_n)^{1/3}\}$$

where:
$X/X_n > 0.008856$
$Y/Y_n > 0.008856$ $$b^* = 200\{(Y/Y_n)^{1/3} - (Z/Z_n)^{1/3}\}$$

where:
$Z/Z_n > 0.008856$
$Y/Y_n > 0.008856$
where $X_n, Y_n, Z_n$ specifies the "white object color stimulus". FIG. 1 illustrates the coordinate assignments in the CIE L*a*b* color space.

Morovic et al. then perform gamut mapping in CIE L*a*b* space and the resulting CIE L*a*b* coordinates are then transformed back to XYZ tristimulus coordinate values, using an output device's substrate as the white point. The resulting tristimulus XYZ values are then transformed into colorant amounts for an ink jet printer.

The procedure utilized by Morovic et al. is schematically illustrated in FIG. 2, wherein the monitor RGB values are transformed to CIE L*a*b* color space which is then gamut mapped to the printer's CIE L*a*b* color space. The resulting L*a*b* color values are then further mapped to the printer's cyan, magenta and yellow primary colors. The gamut mapping, as achieved by the aforesaid conversion, is then utilized to create a color map which is installed in the printer.

To convert monitor RGB values to gray levels for reproduction by a color printer, the prior art (see FIG. 3) has converted the monitor RGB color values to CIE L*a*b* color values (via an intermediate XYZ conversion). Thereafter, the lightness (i.e., L*) values have been directly mapped to printer gray levels. Once such a gamut mapping was achieved, the resulting mapped values were converted to a table which was used to control the printer.

A more common prior art procedure for converting RGB colors to gray levels is described in SMPTE RECOMMENDED PRACTICE, RP 177-1993, section 3.3.8. In that document, the luminance value (i.e., the Y coordinate in XYZ color space) is defined as:

$$Y = Y_R(R) + Y_G(G) + Y_B(B)$$

The derived Y luminance values are then scaled to gray levels.

Gamut mapping from a monitor's color space to a color or monochrome printer's gray levels has presented certain special problems. For instance, the above indicated color conversion procedure results in certain color components not reproducing well in the resulting gray image. For example, certain cyan components and yellow components of the image will disappear. This is especially the case when light and medium green colors are fed from the monitor to the printer—as the printer is particularly adapted to producing dark greens and not the lighter shades. Accordingly, the lighter shades are reproduced poorly or not at all.

Accordingly, it is an object of this invention to provide an improved method for converting colors from a first device color space to gray levels which can be reproduced by a color or monochrome rendering device.

It is a further object of this invention to provide a method for converting colors from a first device color space to gray levels in a second device color space wherein improved gray representations are achieved.

SUMMARY OF THE INVENTION

The method of the invention converts colors resident in a first device color space to gray levels for reproduction in a color or monochrome rendering device. The method initially converts the color values resident in the first device color space to corresponding color values in a device independent color space. Next, the resulting color values in the device independent color space are converted to further color values in the same color space that correspond to color values resident in the color space of a target color rendering device. The further color values from the device independent color space are then converted to corresponding gray levels so that they may be rendered by either the target color rendering device or a different color or monochrome rendering device. The use of an intermediate gamut conversion within the device independent color space enables more precise gray representations to be achieved for certain color representations.

DETAILED DESCRIPTION OF THE INVENTION

Figure 1:
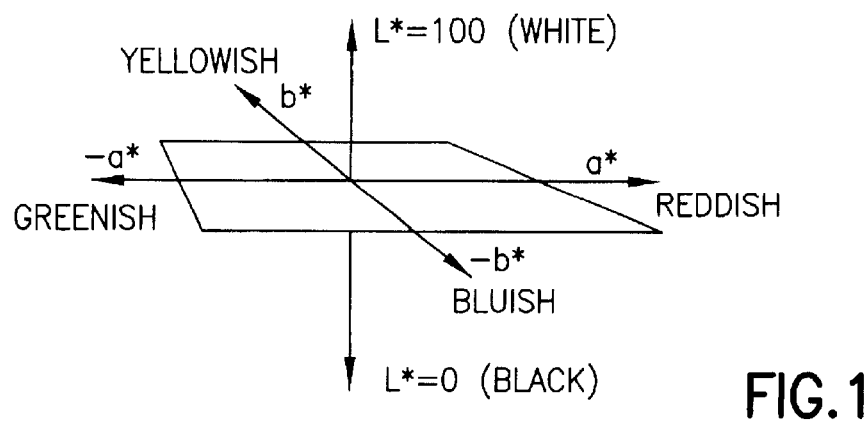
FIG. 1 illustrates the coordinate assignments in the CIE L*a*b* color space.
Figure 2:
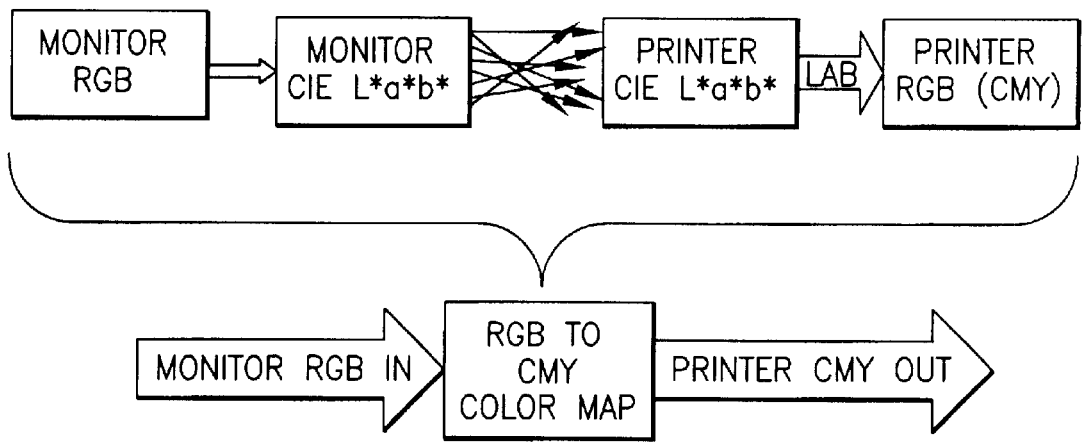
FIG. 2 is a schematic representation of a prior art method for mapping monitor RGB values to printer CMY values.
Figure 3:
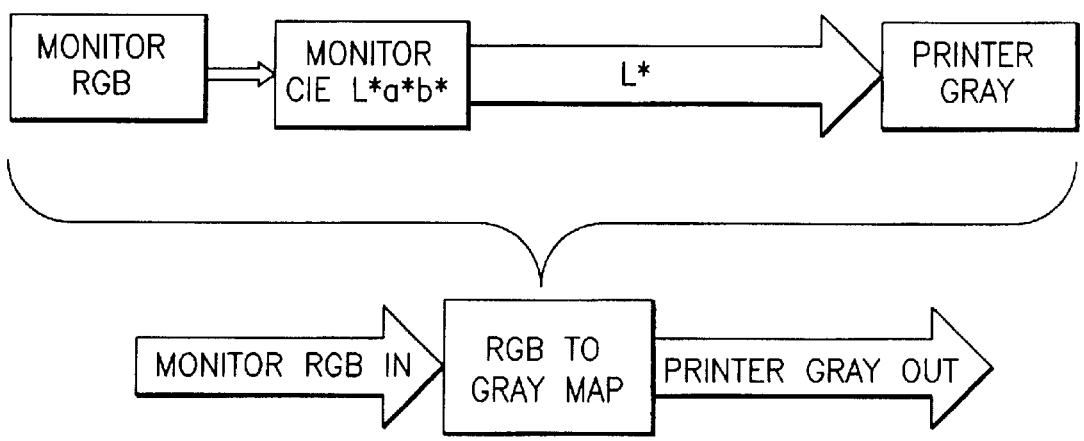
FIG. 3 is a schematic representation illustrating a prior art method for converting monitor RGB values to a printer gray level color space using an intermediate CIE L*a*b* color space conversion.
Figure 4:
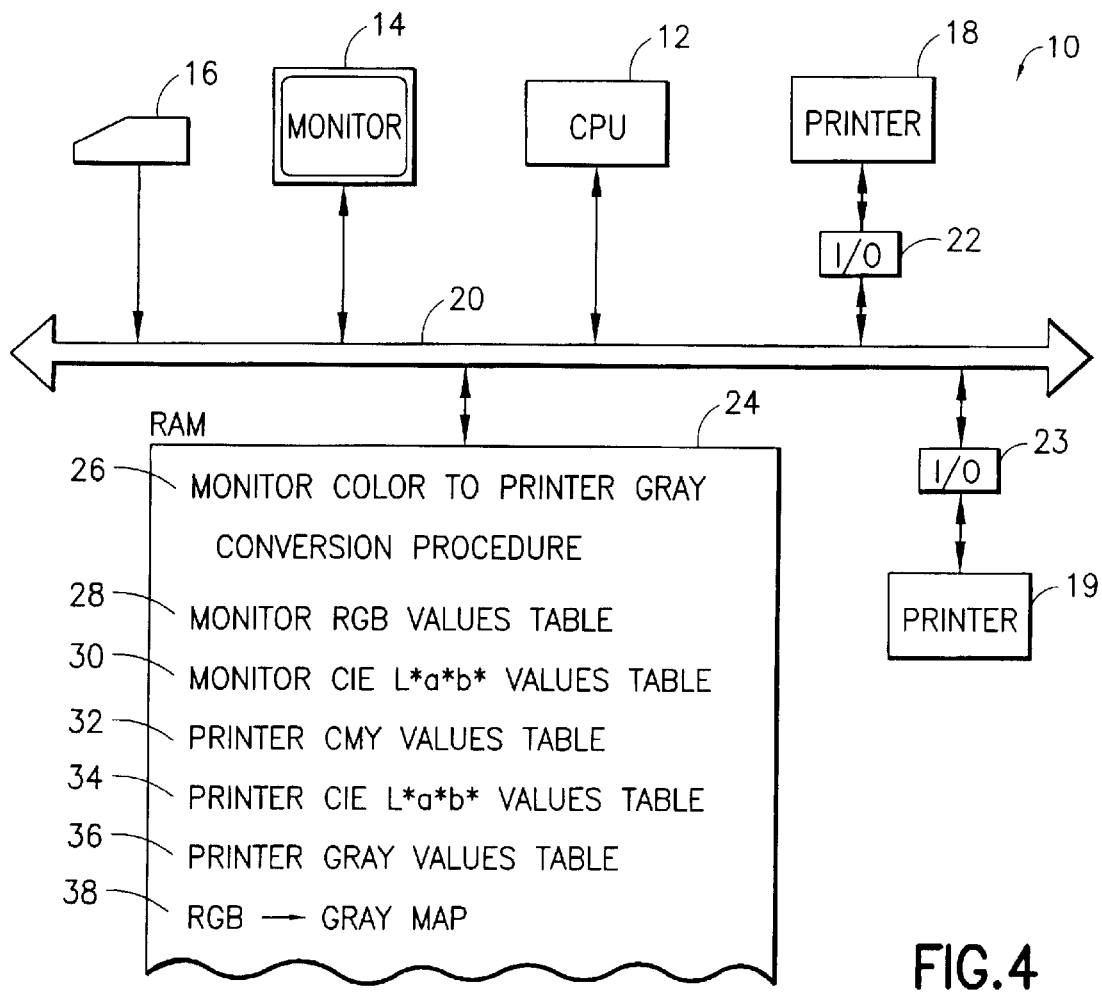
FIG. 4 illustrates a high level block diagram of a computer system that is adapted to carry out the invention hereof.

Referring to FIG. 4, a computer system 10 includes a central processing unit (CPU) 12 that provides overall control of computer system 10. A monitor 14 and keyboard 16 provide a user interface to the remainder of the system. A target printer 18, such as a color laser printer, is coupled to a bus system 20 via an input/output interface 22. A printer 19, such as a color or monochrome laser printer, is coupled to a bus system 20 via an input/output interface 23. Bus system 20 provides the main communication pathway between each of the separate elements of computing system 10.

A random access memory (RAM) 24 provides storage for the procedures and tables which are utilized during execution of the method of the invention. Among other procedures, RAM 24 includes a "monitor color-to-printer gray level" conversion procedure which automatically enables conversion of monitor color values to gray levels for reproduction by printers 18 or 19. As will hereafter be understood, printers 18 or 19 produce the gray values through the use of a single marking medium (i.e., ink or toner), such as black, or a combination of marking media such as cyan, magenta, yellow and/or black.

Also stored within RAM 24 is a red, green and blue color value table 28 that stores a set of RGB color values that are utilized to drive monitor 14 to manifest the respective colors. A monitor CIE L*a*b* value table 30 provides L*a*b* values which reflect conversions of the device specific RGB values to device independent L*a*b* values.

A printer CMY values tables 32 provides cyan, magenta and yellow color values to be utilized by target printer 18 to provide respective color outputs onto media sheets issued by printer 18. A printer CIE L*a*b* value table 34 provides corresponding values (i.e., L*a*b* values) for each of the device specific printer CMY values, but in device independent L*a*b* space. As is known, the CIE L*a*b* representation is a perceptual color space that does not depend upon any device-specific representation. Accordingly, it is equally applicable to monitor color values and to printer color values.

A printer gray value table 36 stores the gray level values that are created as a result of execution of the method of the invention. More particularly, table 36 stores the gray level values that are determined by conversion procedure 26 as providing a best representation of the monitor RGB values contained in table 28. Lastly, an RGB/gray level map 38 is stored in RAM 24 and constitutes a table relating the monitor RGB values to printer gray level values. Table 38 may then be incorporated into a read-only memory for inclusion into printer 18 or 19.

It is to be understood, that the method of the invention is preferably used during a manufacturing operation so that RGB/gray level map 38 may be derived and incorporated in a ROM in printer 18 or 19.

Figure 5:
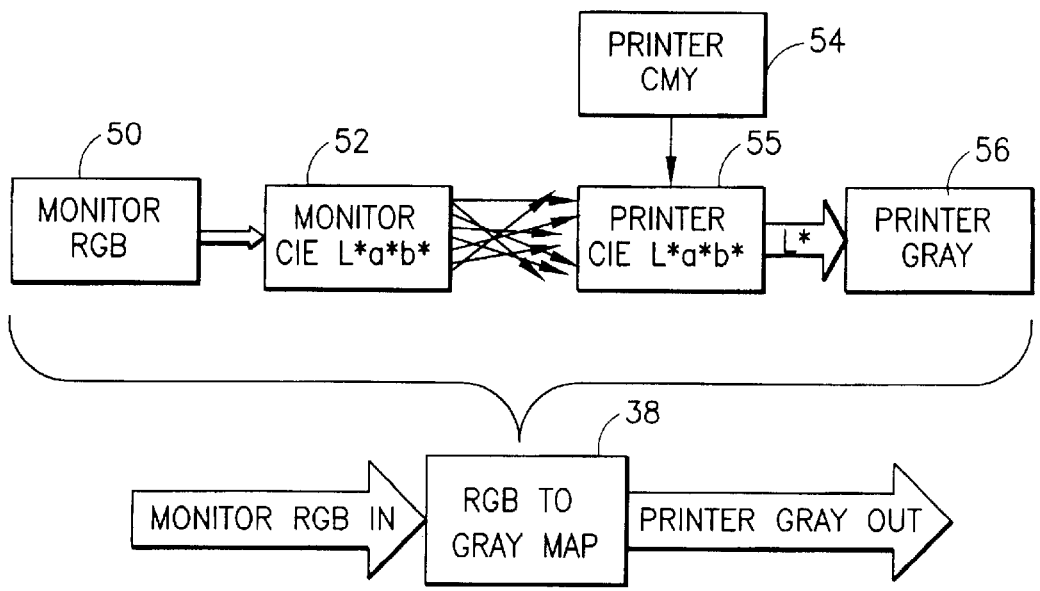
FIG. 5 is a block diagram showing the operation of the system of FIG. 4 wherein a monitor RGB color space is converted to a printer gray level color space, utilizing gamut mapping between two device independent color space representations.

The method of the invention that is performed by conversion procedure 26 is schematically illustrated by FIG. 5. Initially, a set of monitor RGB values 50 from table 28 are subjected to a conversion procedure which converts the RGB values to corresponding color values 52 in CIE L*a*b* color space. The resulting CIE L*a*b values are incorporated into CIE L*a*b* value table 30. The conversion is accomplished through the use of an intermediate translation to color XYZ space and then to the CIE L*a*b* color space 52.

Next, printer CMY values 54 from table 32 are printed and measured on the target color printer 18. The measured values are stored as printer CIE L*a*b* colors 55. More particularly, this action converts the CMY printer values to corresponding device independent color values in the CIE L*a*b* color space, which color values are stored in printer CIE L*a*b* values table 34.

At this stage, monitor CIE L*a*b* color table 30 incorporates L*a*b* values for each of the monitor RGB colors. In similar fashion, printer CIE L*a*b* values table 34 contains L*a*b* values for each of the printer colors. Now a gamut mapping procedure is undertaken to most closely equate the monitor CIE L*a*b* color values 52 to the printer CIE L*a*b* color values 55. Since both sets of values appear in the same coordinate regime, such mapping is readily accomplished.

The objective of such gamut mapping is to most closely match the perceived colors from monitor RGB colors 50 to printer CMY colors 54. The above cited paper to Morovic et al. provides teachings of a plurality of procedures which can be used to achieve the aforesaid gamut mapping.

Once gamut mapping has been accomplished, each color value in monitor CIE L*a*b* color space 52 has a corresponding color value in printer CIE L*a*b* color space 55. At this stage, the lightness (L*) value for each printer CIE L*a*b* color value 55 is accessed and used as a measure of the printer gray level value to be output. More specifically, each color lightness value in printer CIE L*a*b* space 55 is caused to have a corresponding printer gray value 56. At this stage, each monitor RGB color 50 can now be tracked to a specific printer gray value 56. That relationship is fixed in RGB-to-gray level map 38. Thus, when a monitor RGB value is applied to map 38, a resulting printer gray value is provided that has been determined to be most closely related to the input RGB value.

Once map 38 is derived, the values in the monitor and printer CIE L*a*b* spaces are no longer needed.

By utilizing the mapped monitor and printer CIE L*a*b* color space values to achieve printer gray level values, an improved gray representation is achieved of certain colors that would otherwise not be well represented, lacking the mapping of the monitor CIE L*a*b* values to the printer CIE L*a*b* values. Such mapping can take into account and correct both yellow and cyan monochrome reproduction sensitivities which exist in both color and monochrome printers.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for converting colors resident in a first device color space to gray levels to be reproduced by a first color or monochrome rendering device to achieve gray levels, the method comprising the steps of:
    a) converting said color values resident in said first device color space to corresponding color values in a device independent color space;
    b) converting said corresponding color values in said device independent color space to further color values in said device independent color space that correspond to color values resident in a color space produced by a second target color rendering device; and
    c) converting said further color values from said device independent color space to corresponding gray levels for reproduction by said second target color rendering device or said first color or monochrome rendering device.

2. The method as recited in claim 1, wherein said first device color space is the color space representative of colors presented by a cathode ray tube color monitor.

3. The method as recited in claim 2, wherein said first device color space is standard Red Green Blue (sRGB).

4. The method as recited in claim 3, wherein said color space produced by said first color or monochrome rendering device includes cyan, magenta and yellow (CMY).

5. The method as recited in claim 1, wherein said first color or monochrome rendering device is a color printer.

6. The method as recited in claim 1 wherein said second target color rendering device is a color printer.

7. The method as recited in claim 1 wherein the second target color rendering device is the first color rendering device.

8. The method as recited in claim 1, wherein said device independent color space is CIE L*a*b color space.

9. The method as recited in claim 1, comprising the further step of:
    d) deriving a table which maps said color values resident in said first device color space to corresponding gray level values.

10. The method as recited in claim 1 wherein the gray levels are reproduced using a single marking medium.

11. The method as recited in claim 1 wherein the gray levels are reproduced using a combination of marking media.

12. A method of providing a color to gray level conversion device comprising:
    a) converting a plurality of color values resident in a first device color space to corresponding color values in a device independent color space;
    b) converting said corresponding color values in said device independent color space to further color values in said device independent color space that correspond to color values resident in a color space produced by a target color rendering device;
    c) converting said further color values from said device independent color space to corresponding gray levels; and
    d) storing a table which maps color values resident in said first device color space to corresponding gray levels within said conversion device.

13. The method as recited in claim 12, wherein said conversion device comprises a non-volatile storage device.

14. The method as recited in claim 12, wherein said conversion device comprises a read only memory storage device.

15. The method as recited in claim 12, further comprising providing the conversion device within a monochrome rendering device.

16. The method as recited in claim 12, further comprising providing the conversion device within a color rendering device.

17. The method as recited in claim 16, wherein the providing comprises providing the conversion device within the color rendering device comprising the target color rendering device.

18. The method as recited in claim 16, further comprising deriving the table which maps said color values resident in said first device color space to said corresponding gray levels responsive to the convertings.

19. The method as recited in claim 12, wherein the gray levels are reproduced using a single marking medium.

20. The method as recited in claim 12, wherein the gray levels are reproduced using a combination of marking media.

* * * * *